United States Patent [19]
Hachenburg

[11] 3,890,471
[45] June 17, 1975

[54] LOOP DATA TRANSMISSION ARRANGEMENT EMPLOYING AN INTERLOOP COMMUNICATION TERMINAL

[75] Inventor: Victor Hachenburg, Naperville, Ill.

[73] Assignee: Bell Telephone Laboratories, Incorporated, Murray Hill, N.J.

[22] Filed: Dec. 17, 1973

[21] Appl. No.: 424,934

[52] U.S. Cl. .......... 179/15 AL
[51] Int. Cl. .......... H04j 3/08
[58] Field of Search .......... 179/15 A, 15 AL; 340/172.5

[56] References Cited

UNITED STATES PATENTS

| | | | |
|---|---|---|---|
| 3,544,976 | 7/1968 | Collins | 340/172.5 |
| 3,586,782 | 6/1971 | Thomas | 179/15 AL |
| 3,732,374 | 5/1973 | Rocher | 179/15 AL |
| 3,732,543 | 5/1973 | Rocher | 340/172.5 |
| 3,748,647 | 7/1973 | Ashany | 340/172.5 |
| 3,755,789 | 8/1973 | Collins | 340/172.5 |

*Primary Examiner*—Ralph D. Blakeslee
*Attorney, Agent, or Firm*—J. C. Albrecht

[57] ABSTRACT

A data transmission arrangement comprising a plurality of data transmission loops wherein pairs of data transmission loops are interconnected by an interloop communication terminal. An interloop communication terminal comprises means for monitoring messages received on one loop of the pair to which it is connected to determine if the individual messages received are destined for the second loop of the pair and further comprises means for monitoring messages received on the second loop of the pair to determine if the second loop is busy or idle. In addition, an interloop communication terminal further includes means for immediately transmitting on the second loop a message received on the first loop if the message is intended for the second loop and the second loop is idle or for storing the message if the second loop is busy.

11 Claims, 12 Drawing Figures

CONTROL CIRCUIT
STATE TRANSITION CHART

| SIGNALS / CURRENT CONTROL STATE | Y1=1 | Y2=1 | Y3=1 | Y4=1 | Y5=1 | Y6=1 | Y7=1 | Y8=1 | Y9=1 | Y10=1 | Y11=1 | Y12=1 | Y13=1 | Y14=1 | Y15=1 | |
|---|---|---|---|---|---|---|---|---|---|---|---|---|---|---|---|---|
| 00110 | 00010 | 00100 | 00111 | 01110 | | | | | | | | | | | | |
| 00010 | | | | | 00110 | | | 01010 | | | | | | | | |
| 00100 | | | | | 00110 | | | | 00101 | | | | | | | |
| 00111 | | | | | | 01111 | | | | | | | | | | |
| 01110 | | | | | | | 01111 | | | | | | | | | |
| 01011 | | | | | | | | | | 11011 | 01111 | | | | | |
| 01101 | | | | | | | | | | | | 11101 | 01111 | | | |
| 01111 | | | | | | | | | | | | | | 01011 | 01101 | |
| 01010 | | | | | | | | | | | | | | | | 01011 |
| 00101 | | | | | | | | | | | | | | | | 01101 |
| 11011 | | | | | | | | | | | | | | | | 11111 |
| 11101 | | | | | | | | | | | | | | | | 11111 |
| 11111 | | | | | | | | | | | | | | | | 10110 |
| 10110 | | | | | | | | | | | | | | | | 00110 |

FIG. 5

| CONTROL STATES | GATING SIGNALS FROM CONTROL CIRCUIT | | | | | | | |
|---|---|---|---|---|---|---|---|---|
| | Z1 | Z2 | Z3 | Z4 | Z5 | Z6 | Z7 | Z8 |
| 00110 | 0 | 0 | 1 | 0 | 0 | 1 | 0 | 0 |
| 00010 | 0 | 0 | 0 | 1 | 0 | 0 | 0 | 1 |
| 00100 | 0 | 0 | 0 | 0 | 1 | 0 | 1 | 1 |
| 00111 | 0 | 0 | 0 | 0 | 1 | 1 | 0 | 0 |
| 01110 | 0 | 0 | 1 | 0 | 0 | 0 | 0 | 1 |
| 01011 | 0 | 1 | 1 | 0 | 0 | 0 | 0 | 1 |
| 01101 | 1 | 0 | 0 | 0 | 1 | 1 | 0 | 0 |
| 01111 | 0 | 0 | 1 | 0 | 0 | 1 | 0 | 0 |
| 01010 | 0 | 0 | 0 | 1 | 0 | 0 | 0 | 1 |
| 00101 | 0 | 0 | 0 | 0 | 1 | 0 | 1 | 1 |
| 11011 | 0 | 1 | 1 | 0 | 0 | 0 | 0 | 1 |
| 11101 | 1 | 0 | 0 | 0 | 1 | 1 | 0 | 0 |
| 11111 | 0 | 0 | 1 | 0 | 0 | 1 | 0 | 0 |
| 10110 | 0 | 0 | 1 | 0 | 0 | 1 | 0 | 0 |

FIG. 6

| | |
|---|---|
| FIG. 6A | FIG. 6B |
| FIG. 6C | FIG. 6D |

PATENTED JUN 17 1975 3,890,471

SHEET 9

LOOP DATA TRANSMISSION ARRANGEMENT EMPLOYING AN INTERLOOP COMMUNICATION TERMINAL

BACKGROUND OF THE INVENTION

1. Field of the Invention

This invention relates to digital transmission arrangements and, more particularly, to loop digital transmission arrangements wherein serial data signals are transmitted between terminals serially connected in any one of a plurality of digital transmission loops.

2. Description of the Prior Art

Numerous digital transmission arrangements for transmitting data between a plurality of data sources have been proposed in recent years. For example, in one system, exemplary of other systems known in the prior art, a number of access stations are serially connected in any one of a plurality of digital transmission loops. Each loop employs one special station to provide synchronization and regeneration of transmitted signals. In transmitting a message between access stations, the originating access station inserts the message in a vacant, preestablished, standard length message block containing a synchronization code field, a detection code field, a source code field, and a plurality of data fields of limited bit length. The entire message is shifted through shift registers in each access station electrically interposed between the originating access station and the destination access station even though the message is not intended for those stations. If the originating access station and the destination access station are on different transmission loops, the message is temporarily stored in a loop interconnection station and is retransmitted on the appropriate loop at a later time. When the message is received by the destination station, it is removed from the message block; the block is marked with a vacant code making the block available for use in transmitting another message. It is of interest to note that a message cannot be transmitted by an access station until a vacant message block is detected. The message blocks are typically long compared to the address fields and thus a station may have to wait a considerable time before it is able to transmit a message. In addition, since all messages originating in an access station on one loop and destined for an access station on another loop must be stored, considerable storage capacity may be required and messages may be delayed substantially.

With the development of digital transmission techniques, it has become possible to construct digital transmission loops and terminals wherein the transmission of messages is not confined to predetermined transmission blocks. Moreover, transmission terminals are now possible which minimize the transmission delay incident to the electrical interposition of such terminals between an origination and a destination station. More specifically, transmission terminals of this type are disclosed in copending application Ser. No. 397,122, filed Sept. 12, 1973. Since the terminals disclosed in the copending application minimize transmission delay resulting from the interposition of terminals between source and destination terminals and the terminals do not require the use of fixed transmission blocks, the efficiency of loop transmission arrangements wherein these terminals are employed is improved for selected types of message sources. However, if such terminals are serially connected in any one of a plurality of transmission loops and it is necessary that messages be communicated between the loops, an interloop communication terminal is required which also is capable of operating without predefined transmission blocks and which, preferably, minimizes transmission delay.

SUMMARY OF THE INVENTION

A data transmission arrangement is provided in which a plurality of transmission terminals are serially connected in any one of a plurality of unidirectional, data transmission loops. A pair of such data transmission loops are interconnected for the communication of messages between terminals on the respective loops by an interloop communication terminal. According to this invention an interloop communication terminal for interconnecting a pair of transmission loops comprises means for monitoring data signals received by the terminal on one of the respective pair of transmission loops to detect the reception of a message directed to a terminal appearing on the other transmission loop of the pair and means for transmitting such a message on the other transmission loop if the other loop is not busy, or for storing such message if the other loop is busy.

BRIEF DESCRIPTION OF THE DRAWING

FIG. 5 shows a table of gating signals produced by the control circuit shown in FIG. 2;

FIG. 6, including

DETAILED DESCRIPTION OF THE ILLUSTRATIVE EMBODIMENT

Figure 1:
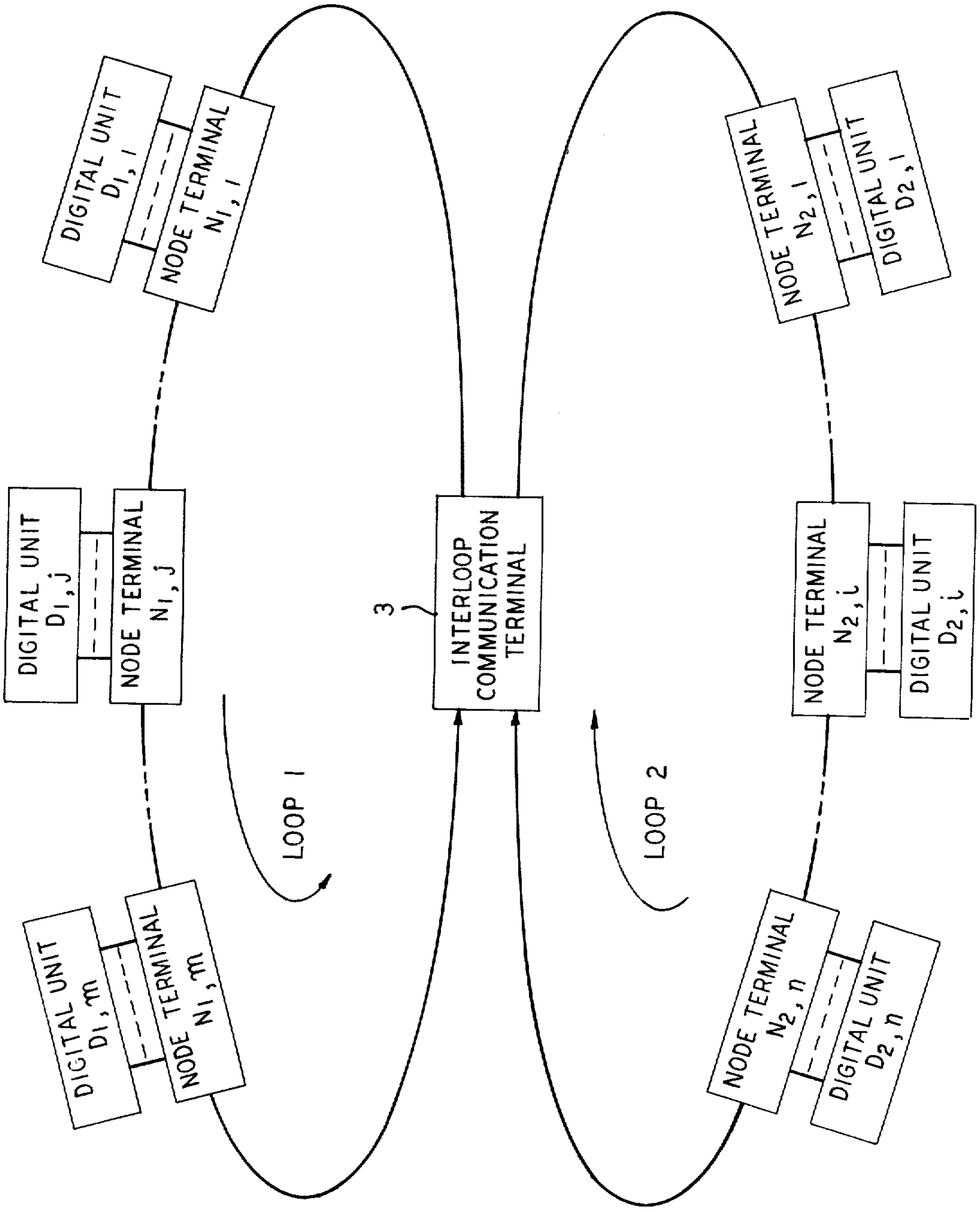
FIG. 1 shows a pair of data transmission loops interconnected by an interloop communication terminal.

A data transmission arrangement employing applicant's invention is shown in FIG. 1. It can be seen therein that node terminals $N_{1,1}$ through $N_{1,m}$ are connected serially in transmission loop 1 which loop originates and terminates on the interloop communication terminal 3. Similarly, node terminals $N_{2,1}$ through $N_{2,n}$ are serially interconnected in data transmission loop 2 which originates and terminates on interloop communication terminal 3. It is the function of the interloop communication terminal 3 to monitor the messages transmitted on the loop 1 for the purpose of determining whether such messages are intended for the loop 2. If a received message is intended for the loop 2, the interloop communication terminal 3 immediately transmits the message on loop 2 if no interference with another message on loop 2 will result. If interference will result from the transmission of the message on loop 2, the terminal 3 stores the message or retransmits the message on the loop 1. Similar operations are performed with respect to messages received on loop 2.

It should be noted that the node terminals are the type disclosed in the priorly mentioned copending application. They serve as a transmission interface for the respectively associated digital units. More specifically, the node terminal $N_{1J}$ connected to the digital unit $D_{1J}$ provides the transmission loop 1 interface for the digital unit $D_{1J}$. That digital unit could perhaps be a disk file store, a digital computer drum memory, or a digital computer itself. In fact, it could be any type of digital unit. The same general comments apply to the digital units connected to the node terminals of the loop 2. The specific characteristics of the node terminals and digital units are not part of this invention and will not be discussed in detail.

Figure 2:
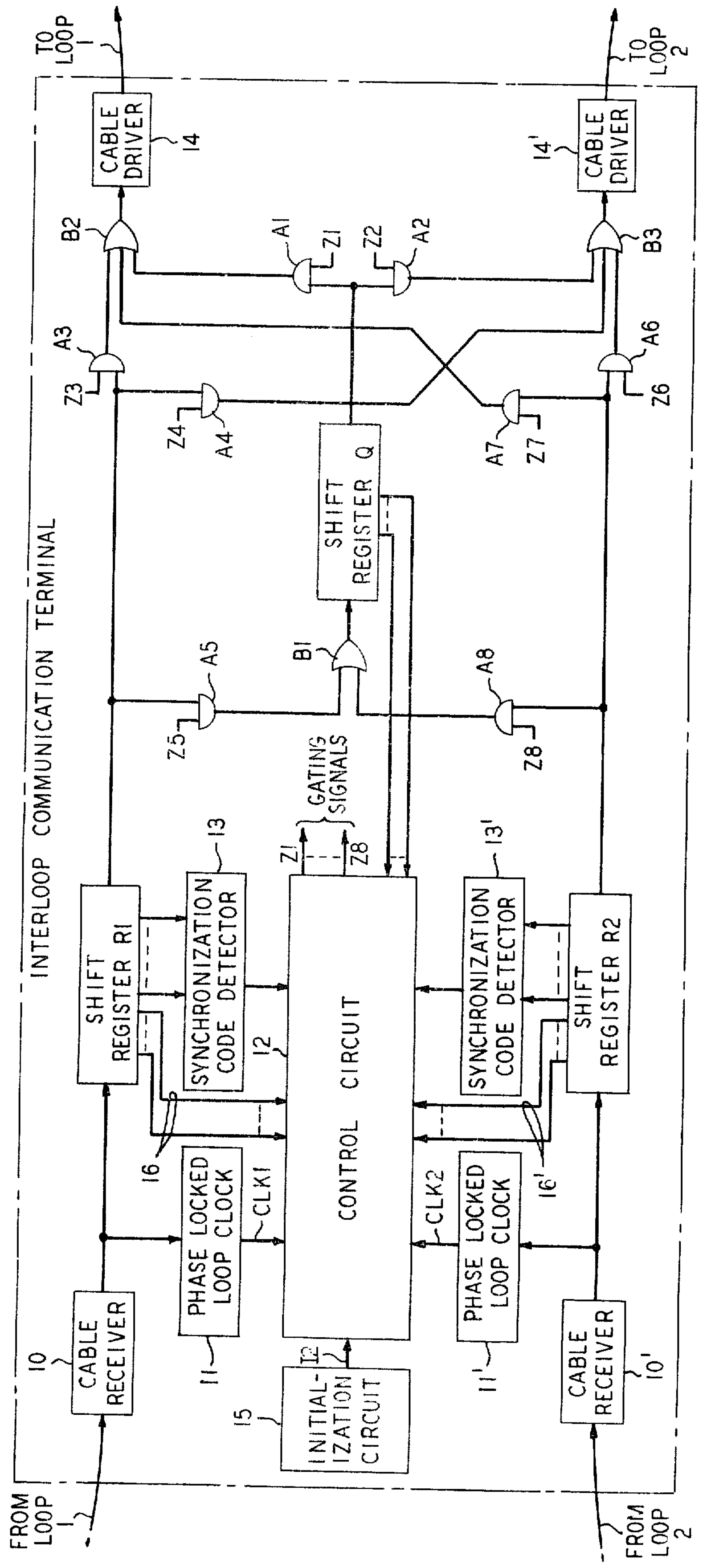
FIG. 2 shows a functional block diagram of the interloop communication terminal shown in FIG. 1.

Attention is now turned to the more detailed block diagram representation of the interloop communication terminal shown in FIG. 2. As can be seen, the structure of the terminal is quite symmetric, that is, elements necessary for the performance of operations on messages received from the loop 1 are repeated to perform similar operations for messages received from the loop 2. Therefore, for the purpose of brevity and to the extent possible, the discussion below of the interloop communication terminal will be limited to the operation performed on messages received from the loop 1. It should be understood, however, that similar operations are performed for messages received from the loop 2.

It is first to be observed that messages received from the loop 1 are processed by the cable receiver 10 and applied to the phase locked loop clock 11 and the shift register R1. The phase locked loop clock 11 may be any one of numerous types well known in the prior art. For example, see D. J. Jones, "Introduction to the Phase-Locked Loop," Electronic Products, Oct. 16, 1972, pages 69 through 75; A. B. Grebene, "The Monolithic Phase Locked Loop: A Versatile Building Block," EDN, Oct. 1972, pages 26 through 31. The output signals of the clock 11 occur at a frequency dependent upon a reference frequency with a variation about that frequency determined by an estimate of the clock frequency of the signals applied to the input of the clock 11. It is this output of the clock 11 which is used to shift signals appearing at the output of the cable receiver 10 into the shift register R1. It should be noted here that any serial storage means which operates in the nature of a shift register could be used for what are referred to herein simply as shift registers.

The signals applied to the shift register R1 are sequentially shifted into the register R1 in response to the signals at the output of the clock 11. While the particular type of serial storage means used as the shift register R1 is not important to this invention, it is necessary that the structure of the register R1 satisfy some conditions. To fully appreciate the required structure of the register R1, however, it is first necessary to understand the message format employed for messages transmitted on the transmission loops. Therefore, a brief description of that message format follows.

Figures 3, 8:
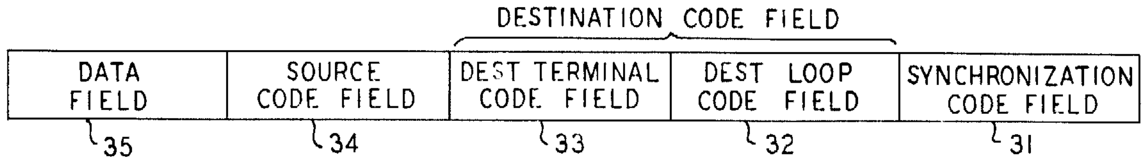
FIG. 3 shows a representation of the format for messages transmitted on the data transmission loops shown in FIG. 1.
FIG. 8 shows a state transition chart for the control circuit shown in FIG. 6.

In FIG. 3 a representation is shown of the format for a message transmitted on either of the transmission loops. It can be seen that the field 31 is the synchronization code field of the message. As such, for each message it contains a synchronization code designed by methods well known in the prior art to synchronize the interloop communication terminal 3 (FIG. 1) to an incoming message and assure that the beginning of the message is properly recognized or detected by the interloop communication terminal 3. The field 32 (FIG. 3) is the destination loop code field. This field in a message contains a code uniquely identifying the transmission loop in which is connected the node terminal N (FIG. 1) for which the message is intended. Thus, when a message is received by the interloop communication terminal 3, the terminal need only check the contents of the destination loop code field 32 (FIG. 3) to determine which of the loops is the destination loop for the message. Since the field 32 is the first information field of a message, the entire message need not be received before this determination can be made. The importance of this characteristic of the message format will become apparent below.

It is of interest to note here that where, as in FIG. 1, only two loops are employed in the transmission arrangement, the destination loop code field 32 may consist of but a single bit. However, as will become apparent, applicant's invention is not limited to application to only the interconnection of two loops. To the contrary, applicant's invention may be applied to the interconnection of an unlimited number of loops in which case the destination loop code field 32 contains a plurality of bits.

The field 33 (FIG. 3) is the destination terminal code field. This field in a message contains a destination terminal code identifying the destination node terminal N (FIG. 1) for which the message is intended. It should be apparent that it is not necessary for this code to identify the loop containing the destination node terminal for the message. Rather, the code need only indicate the particular terminal of the plurality of terminals serially connected in the loop specified by the code contained in the field 32 (FIG. 3) which terminal is the destination node terminal for the message.

The field 34 is the source code field for the message. As such, it contains a source code uniquely and completely identifying the source node terminal for the message. Thus, the source code specifies both the loop and the specific node terminal on the specified loop, which terminal originated the message. Typically, the length of the source code field 34 is equal to the combined length of the fields 31, 32, and 33. The length of the field 31 is added to the lengths of the fields 32 and 33 for reasons not important to this invention but which are taught in the aforementioned copending application. Parenthetically, the combined fields 32 and 33 may be referred to as the destination code field for the message, similar to the destination code field described in the aforementioned copending application.

Finally, the field 35 is the data field for the message. As such it contains the useful data which is desired to be transmitted from one node terminal to another.

With the above understanding of the message format employed in transmitting information on either of the loops shown in FIG. 1, attention is again turned to FIG. 2 and the interloop communication terminal 3 shown therein. It will be recalled that message signals received by the cable receiver 10 are applied to the shift register R1. The register R1 is of a length just sufficient to contain both the synchronization code field 31 (FIG. 3) and the destination loop code field 32 of a received message. When such fields of a message have been shifted into the shift register R1 (FIG. 2), the synchronization code detector 13 detects the synchronization code and generates a signal which is applied to the control circuit 12. This signal notifies the control circuit 12 that the synchronization code of a message has been received by the interloop communication terminal from the loop 1. While a more detailed discussion of the operation of control circuit 12 follows, it can be generally observed here that in response to this signal and in response to the signals appearing on the lines 16 representing the contents of the destination loop code field 32 (FIG. 3) of the received message and other signals, the control circuit 12 (FIG. 2) assumes a selected control state. The control state assumed by the control circuit 12 determines the logical values of the gating signals Z1 through Z8 generated by the control circuit 12. It can be seen in FIG. 2 that the gating signals Z1 through Z8 are applied respectively to the AND gates A1 through A8. As a result, depending upon the logical value of the signals Z1 through Z8, the respective AND gates to which those signals are applied are enabled or disabled to pass message signals applied to their respective other inputs to their respective outputs. It is, thus, the signals Z1 through Z8 which directly control the gating of message signals appearing at the output of the shift register R1, through the remaining portions of the interloop communication terminal 3. Since these signals are determined by the control states of the control circuit 12, it is necessary now to consider the general operation of the control circuit 12.

Figure 4:
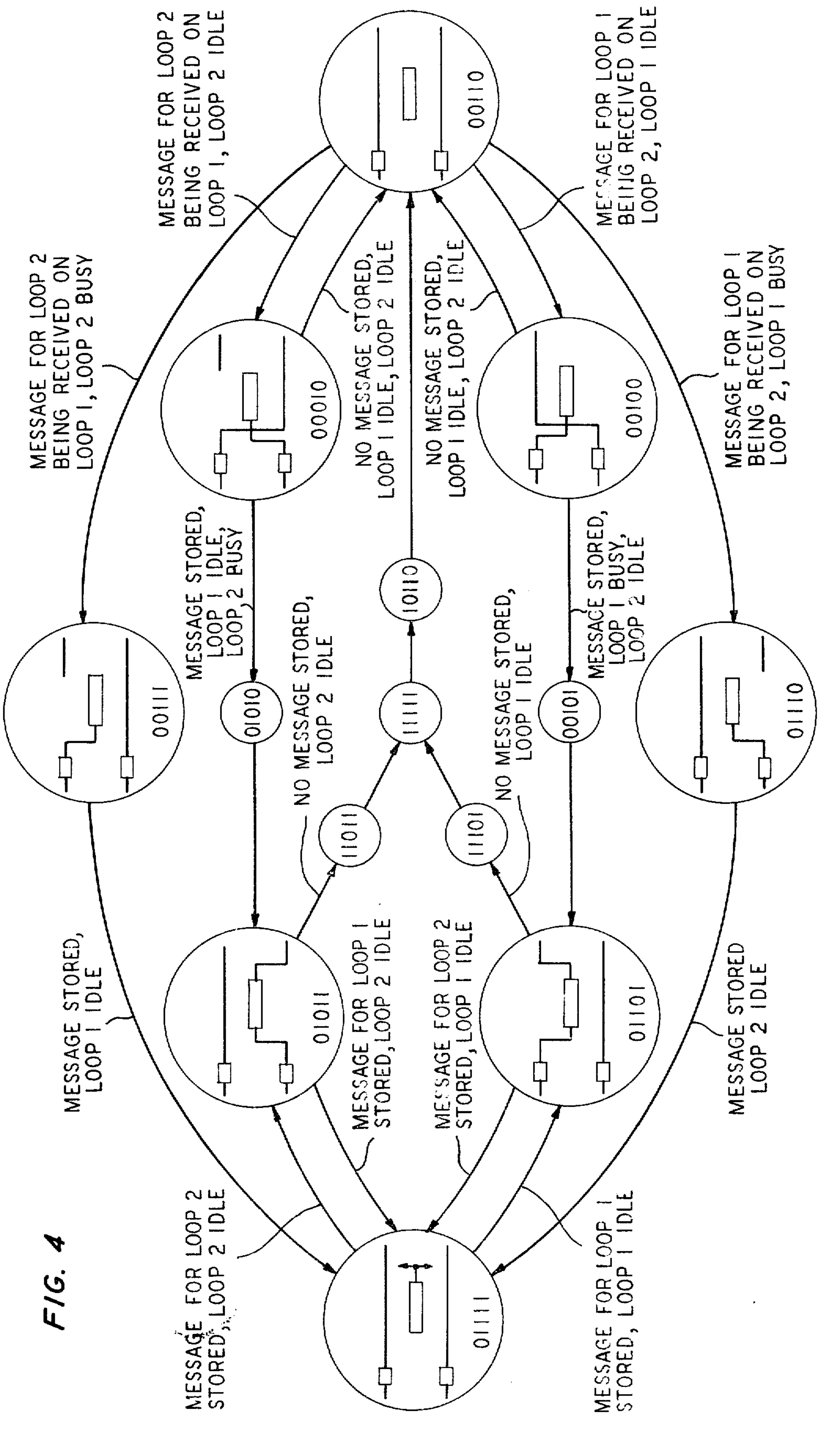
FIG. 4 shows a general state transition diagram for the control circuit shown in FIG. 2.
Figure 6A:
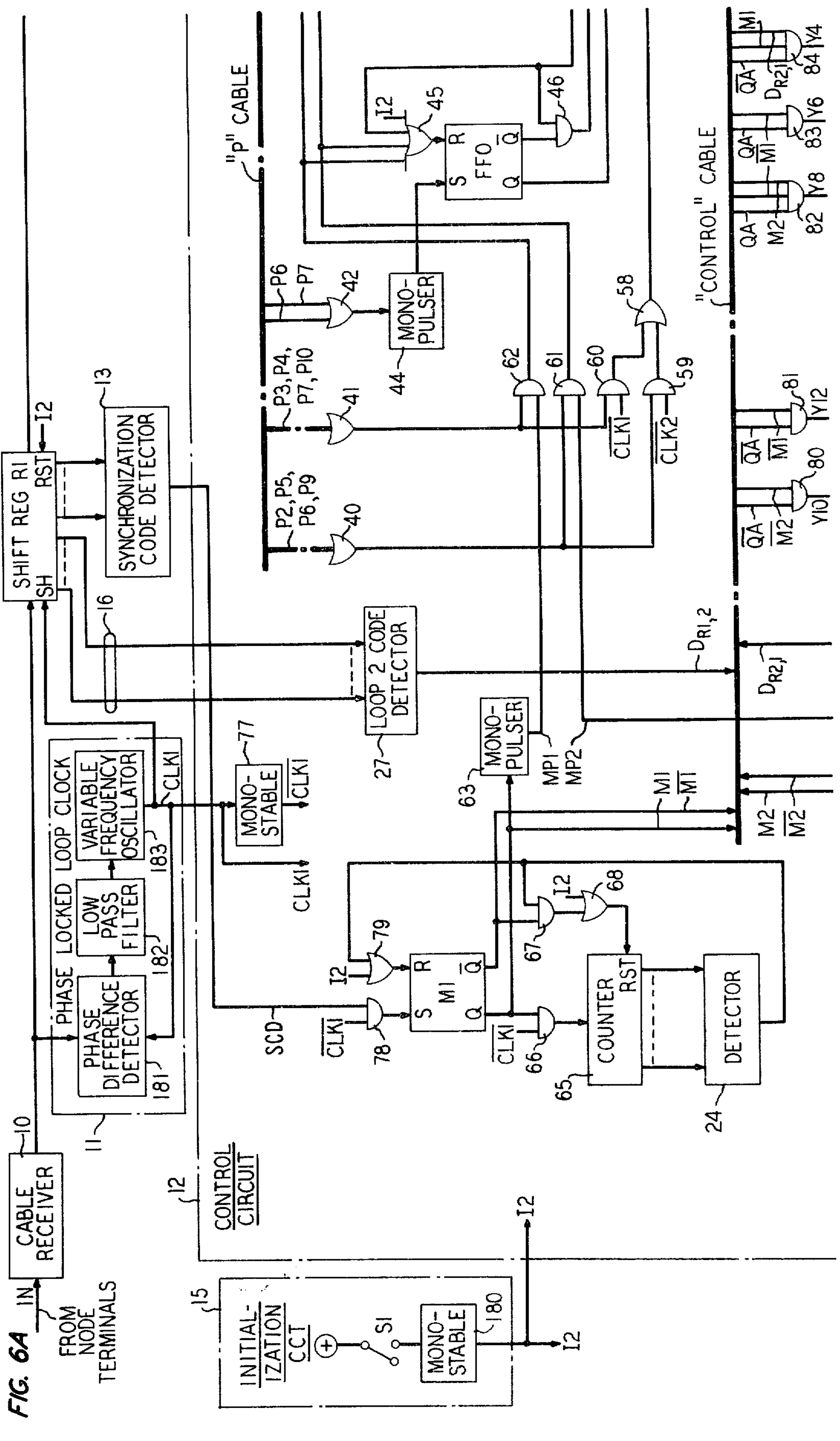
FIGS. 6A through 6D, shows a detailed schematic diagram of the interloop communication terminal shown in FIG. 2.
Figure 6B:
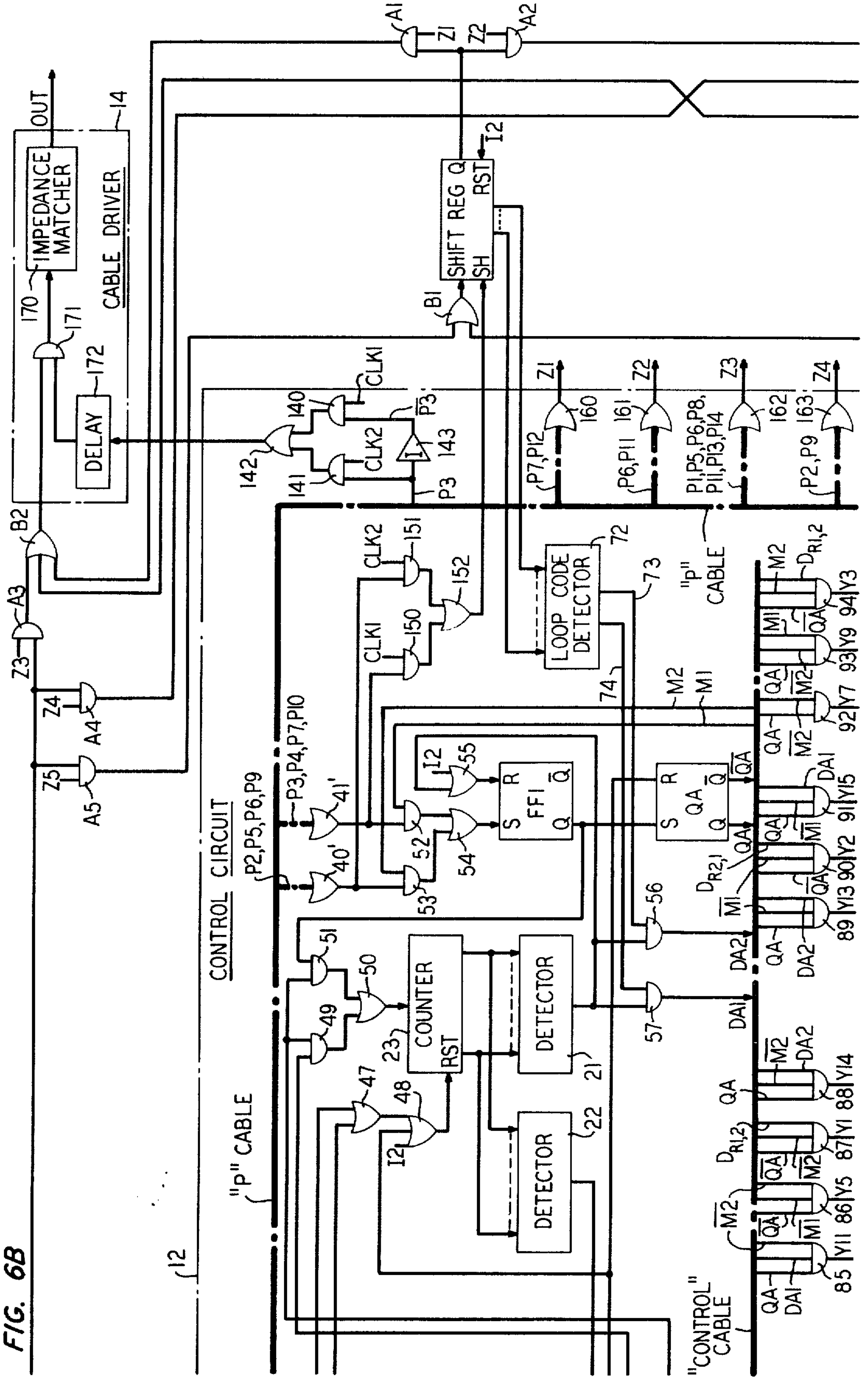
Figure 6C:
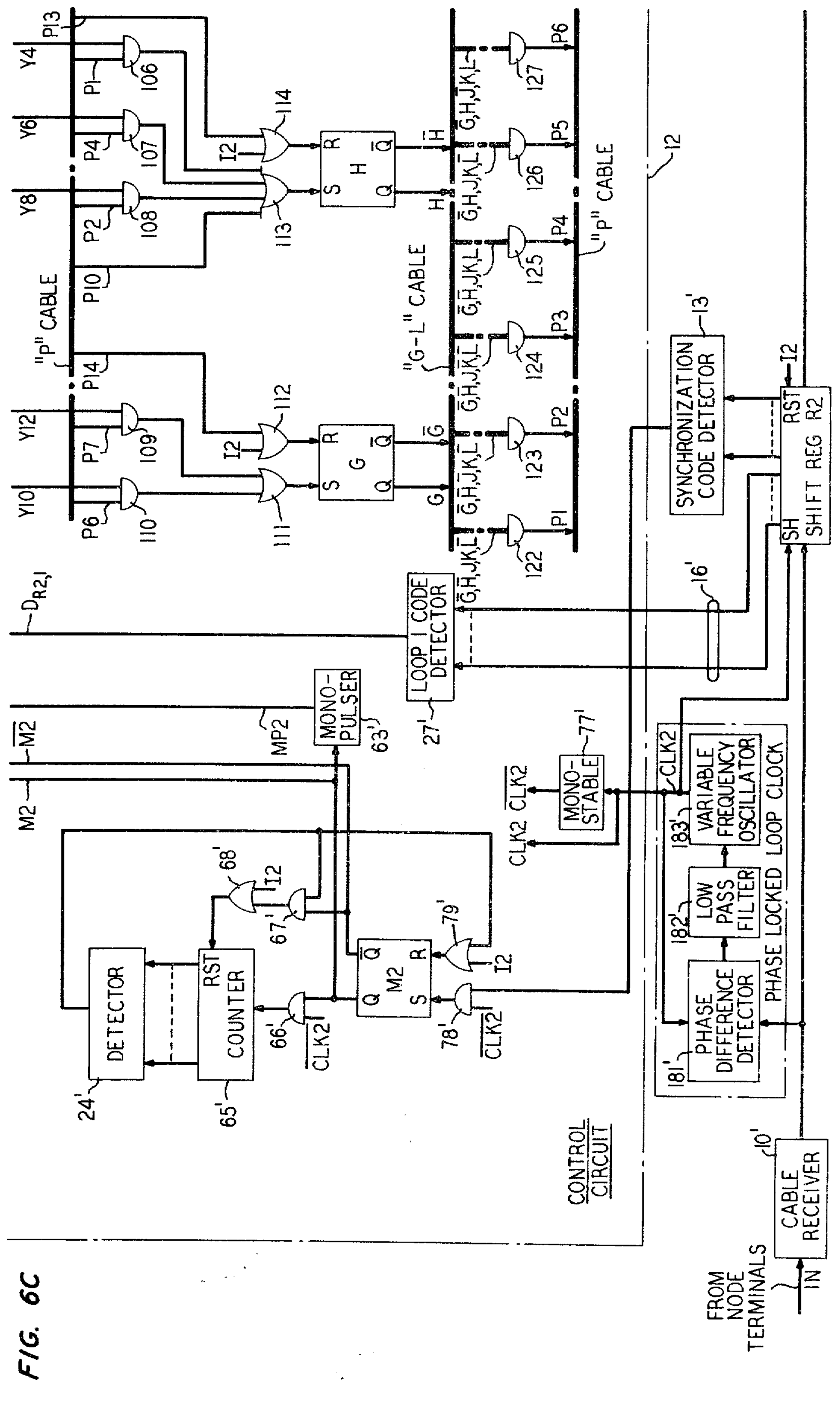
Figure 6D:
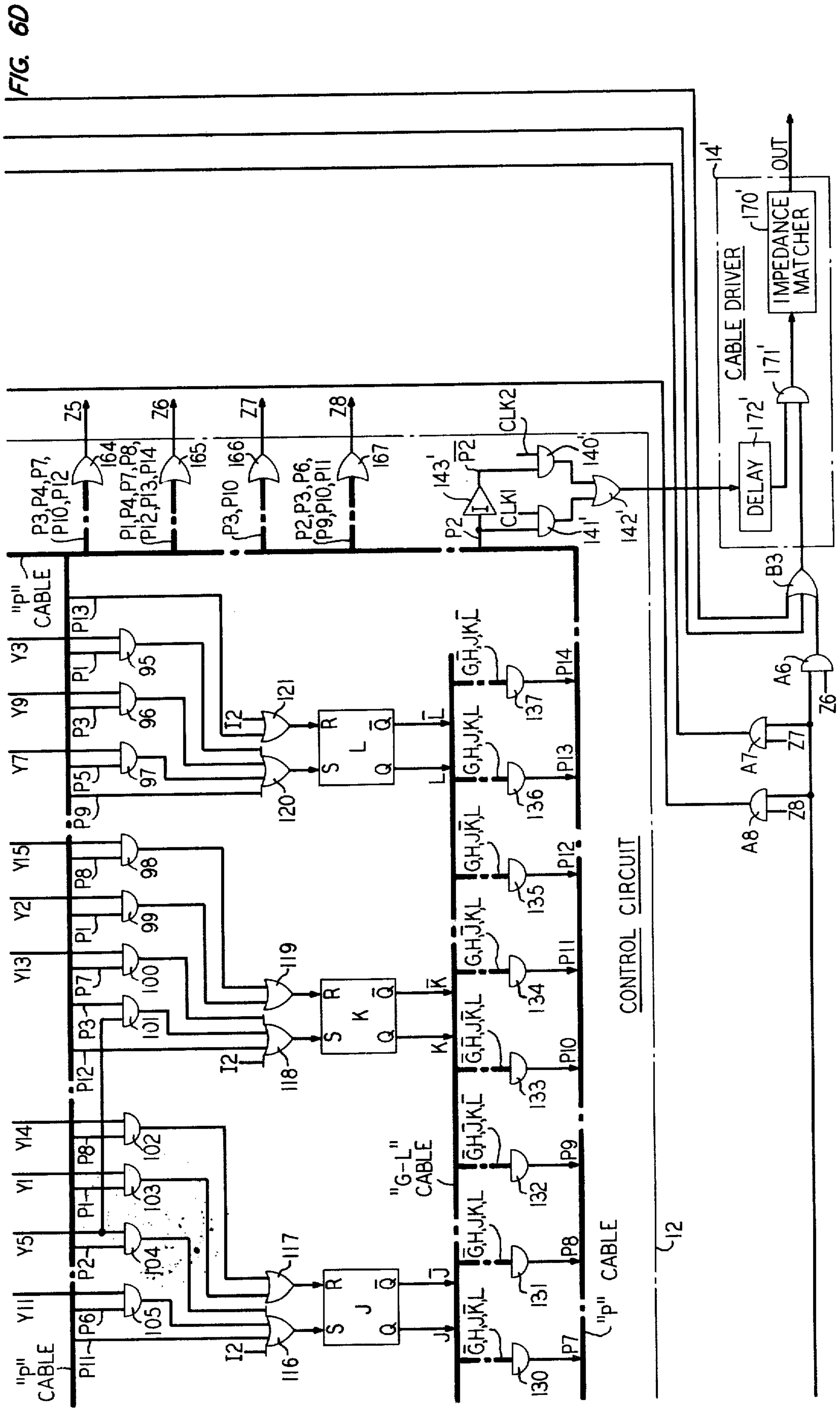

To aid in the understanding of the operation of the interloop communication terminal (FIG. 2) a control state transition diagram for the control circuit 12 is shown in FIG. 4. The control states of the control circuit 12 are represented in the diagram by the circles from which lines emanate and on which lines terminate. The respective control states are uniquely identified by the 5 bit binary codes shown in the circles. These codes will assume added significance in the detailed discussion to follow. However, for now it is sufficient that each uniquely identifies a control state. The symbolic representations within the larger control state circles describe the gating of received signals appearing at the outputs of the registers R1 and R2 (FIG. 2) to shift register Q, the transmission loop 1, or the transmission loop 2. For example, in the control state 00010 (FIG. 4) signals appearing at the output of the shift register R1 (FIG. 2) are gated directly to the loop 2 for transmission thereon, while signals appearing at the output of the register R2 are gated to the input of the shift register Q for storage. In addition, it should be noted that the smaller circles shown in FIG. 4 represent control states referred to as transitional control states for the control circuit 12 (FIG. 2). Such states are required only for timing considerations and they serve merely as intermediate states in the transition from one control state indicated by a larger circle to another control state indicated by a larger circle.

It was mentioned above that the gating signals Z1 through Z8 are generated by the control circuit 12 in response to the control state which the control circuit 12 assumes. A table showing the logical values of the signals Z1 through Z8 for the respective control states of the control circuit 12 is shown in FIG. 5. This figure will be referred to in the following discussion for the purpose of identifying which of the AND gates A1 through A8 (FIG. 2) is enabled by the signals Z1 through Z8.

Returning now to the discussion of the operation of interloop communication terminal 3 (FIG. 1) and referring to FIG. 4, it is assumed that the control circuit 12 is initialized to the control state 00110. In this control state only the gating signals Z3 and Z6, as can be seen in FIG. 5, are equal to logical "1," all other gating signals being equal to "0." Consequently, as long as the control circuit 12 (FIG. 2) remains in the control state 00110 (FIG. 4), the AND gates A3 (FIG. 2) and A6 are enabled to pass signals supplied to their respective other inputs through the OR gates B2 and B3, respectively, to the cable drivers 14 and 14', respectively. The cable drivers transmit the signals supplied to their respective inputs on the loop 1 and loop 2, respectively. Consequently, while the control state 00110 (FIG. 4) is maintained, signals appearing at the output of the shift register R1 (FIG. 2) are retransmitted on the loop 1.

It will be recalled that when the fields 31 and 32 (FIG. 3) of a message have been shifted into the register R1 (FIG. 2) a signal is generated by the synchronization code detector 13. When the signal generated by the synchronization code detector 13 is applied to the control circuit 12, the contents of the destination loop code field 32 (FIG. 3) of the message, represented by signals on the lines 16 (FIG. 2), are examined by the control circuit 12 to determine if the message is directed to a node terminal N (FIG. 1) on loop 2. If such is not the case, the message is shifted through the shift register R1 (FIG. 2) and applied to the loop 1, the control state 00110 (FIG. 4) being maintained. If, however, the contents of the destination loop code field 32 (FIG. 3) for the message indicate that the message is intended for a node terminal N (FIG. 1) on loop 2, one of two control states is assumed by the control circuit 12 (FIG. 2). Referring to FIG. 4 it can be seen that with a message being received for loop 2, the control state 00111 is assumed if, simultaneously, loop 2 is busy; however, the control state 00010 is assumed if, simultaneously, loop 2 is idle. It should be noted that the busy/idle status of loop 2 is dependent upon whether or not a message is being shifted through the shift register R2.

It is first assumed that loop 2 is busy when the message for loop 2 is received on loop 1. Consequently, control circuit 12 (FIG. 2) assumes the control state 00111 (FIG. 4). Referring to FIG. 5 it can be seen that in the control state 00111 the gating signals Z5 and Z6 are both equal to logical 1, all other gating signals being equal to 0. Consequently, the AND gates A5 and A6 (FIG. 2) are enabled to pass to their respective output signals supplied to their respective other inputs. This condition results in the application of signals appearing at the output of shift register R1 through the enabled AND gate A5 and the OR gate B1 to the input of the shift register Q. In addition, the previously assumed message being shifted through the shift register R2 is gated through the enabled AND gate A6 and the OR gate B3 to cable driver 14'.

The control state 00111 (FIG. 4) is maintained until the entire message being received on loop 1 is stored in the shift register Q (FIG. 2) at which point the control state 01111 (FIG. 4) is assumed by the control circuit 12 (FIG. 2). In this control state the gating signals Z3 and Z6 are equal to 1 (FIG. 5), all other gating signals being equal to 0. Consequently, the AND gates A3 and A6 (FIG. 2) are enabled and, as was the case in the control state 00110 (FIG. 4), signals appearing at the respective outputs of the shift registers R1 and R2

(FIG. 2) are applied, respectively, to loop 1 and loop 2. Unlike the control state 00110 (FIG. 4), however, a message is now stored in the register Q (FIG. 2) which at the earliest opportunity should be transmitted on the loop 2.

As soon as loop 2 becomes idle, the control state 01011 (FIG. 4) is assumed by the control circuit 12 (FIG. 2). In this control state gating signals Z2, Z3, and Z8 (FIG. 5) are equal to 1, all other gating signals being equal to 0. As a result the AND gates A2, A3, and A8 are enabled to pass to their respective output signals appearing at their respective other inputs. In this configuration the signals stored in the shift register Q are gated through the enabled AND gate A2 and the OR gate B3 to the cable driver 14'. In addition, signals appearing at the output shift register R1 are gated through the enabled AND gate A3 and through the OR gate B2 to the cable driver 14, and signals appearing at the output of the shift register R2 are gated through the enabled AND gate A8 and the OR gate B1 to the input of the shift register Q. As a result, any message which is received from the loop 1, while the control circuit 12 (FIG. 2) is in this control state, is retransmitted on the loop 1. In addition, not only is the message previously stored in the shift register Q transmitted on the loop 2 but also any message received from the loop 2 and appearing at the output of the shift register R2 is stored in the shift register Q in register stages vacated by the transmission of the message previously stored therein. This configuration of the interloop communication terminal (FIG. 2) ensures that the message transmitted on the loop 2 from the shift register Q will not interfere with messages already present on the loop 2. If a message should be received from the loop 2 and should be stored in the shift register Q, it is immediately retransmitted as it appears at the output of the shift register Q if it is intended for the loop 2. If, however, a message is stored in the shift register Q which is intended for the loop 1, it is not retransmitted and the state 01111 is assumed again.

If the control state 01111 (FIG. 4) is assumed by the control circuit 12 (FIG. 2) from the control state 01011 (FIG. 4), a message is stored in the shift register Q (FIG. 2) which must be transmitted on the loop 1. Therefore, as soon as the loop 1 becomes idle, control state 01101 (FIG. 4) is assumed by the control circuit 12 (FIG. 2) for transmission on the loop 1 of the message stored in the shift register Q. The operation of the control circuit 12 and the interloop communication terminal in the control state 01101 (FIG. 4) is analogous to the previously discussed operation in the control state 01011 with the exception that the roles of loop 1 (FIG. 2) and loop 2 are reversed. More specifically, in the control state 01101 (FIG. 4) the gating signals Z1 (FIG. 2), Z4, and Z6 (FIG. 5) are equal to 1, all other gating signals being equal to 0. Consequently, signals appearing at the output of the shift register R2 are retransmitted on loop 2; the message stored in the shift register Q is transmitted on loop 1; and signals appearing at the output of the shift register R1 are gated into the shift register Q.

Returning to a discussion of the control state 01011 (FIG. 4), if the message stored in the shift register Q (FIG. 2) is transmitted on loop 2 and no message for loop 1 is stored in the shift register Q, then when loop 2 becomes idle, the transitional control state 11011 (FIG. 4) is assumed by the control circuit 12 (FIG. 2). As mentioned previously, the transitional control states serve only to provide proper timing in the control circuit 12. Therefore, the transitional control state 11111 (FIG. 4) is immediately assumed followed by the transitional control state 10110 and ultimately the control state 00110. It will be recognized that this control state is the initialization control state wherein the interloop communication terminal (FIG. 2) is ready to receive transmissions from both loops.

In the earlier discussion of the control state 00110 (FIG. 4) it was assumed that when a message for loop 2 was received on loop 1, loop 2 was busy. If, however, when such a message is received, loop 2 is idle, the control state 00010 is assumed by the control circuit 12 (FIG. 2). In this control state the gating signals Z4 and Z8 (FIG. 5) are both equal to 1, all other gating signals being equal to 0. Consequently, the AND gates A4 (FIG. 2) and A8 are enabled to pass to their respective output signals applied to their respective other inputs. Therefore, the signals appearing at the output of the shift register R1, which are a part of the message intended for loop 2, are gated through the enabled AND gate A4 and the OR gate B3 to the cable driver 14' and, there transmitted on loop 2. It should be noted that the delay of the message has been minimized because the entire message has not been stored before transmission on loop 2. In addition, signals appearing at the output of the shift register R2 are gated through the enabled AND gate A8 and the OR gate B1 to the input of the shift register Q. If no loop 2 message is received and stored in the shift register Q while the message being received on the loop 1 is being transmitted on the loop 2, the control circuit 12 assumes the control state 00110 (FIG. 4). If, however, a message is received on the loop 2 (FIG. 2) during the time required to transmit the message received on loop 1, the message received on loop 2 is stored in the register Q. In addition, as soon as the message being received on loop 1 is complete and the loop 1 becomes idle, the transitional control state 01010 (FIG. 4), is assumed by the control circuit 12 (FIG. 2). Thereafter, the control state 01011 is immediately assumed and operations are performed in that state as previously described.

The above discussion has described the operation of the interloop communication terminal 3 (FIG. 1) for the control states 00110 (FIG. 4), 00111, 01111, 01011, 00010, and 01101. It can be readily recognized that the operation in the control state 01110 is analogous to the operation in the control state 00111 and that the operation in the control state 00100 is analogous to that previously discussed for the control state 00010, the difference being in the transposition of operations on the respective loops. Thus, from all of the above, it can be seen that the interloop communication terminal 3 (FIG. 1) operates to receive messages from one loop and, as required, to transmit those messages on the other loop with the minimum delay possible. In addition, it can be seen that the interloop communication terminal 3 operates without reliance upon predefined transmission blocks and without requiring that both transmission loops be in synchronism.

To more fully describe the detailed operation of the interloop communication terminal 3 reference will be made below to the schematic diagram of the interloop communication terminal 3 shown in FIG. 6 including FIGS. 6A through 6D.

Detailed Discussion of the Interloop Communication Terminal

In the detailed representation of the control circuit 12 (FIG. 6) it should be noted first that the flip-flops G, H, J, K, and L constitute the control state memory of the sequential circuit comprising the control circuit 12. It is the respective states of these flip-flops which determine the control state of the control circuit 12. To illustrate, consider the initialization of the control circuit 12 to the control state 00110. When the switch S1 in the initialization circuit 15 is activated, the monostable 180 responds by producing a pulse signal I2 = 1. The pulse signal I2 = 1 is applied to inputs of the OR gates 112, 114, 116, 118, and 121. As a result of the application of the signal to these OR gate inputs, a 1 signal appears at the R, or reset, input of the flip-flops G, H, and L and a 1 signal appears at the S, or set, input of the flip-flops J and K. As a result, flip-flop G is reset, as is the flip-flop H, the flip-flop J is set, as is the flip-flop K, and the flip-flop L is reset. It should be noted that the signals appearing at the Q outputs of these flip-flops are designated by the same letter as is the flip-flop itself. Thus, the Q output signal for the flip-flop G is designated G and when the flip-flop G is set, the signal G is equal to 1. Thus, the signals representing the outputs of the flip-flops are G = 0, H = 0, J = 1, K = 1, and L = 0. The respective values of these signals read in the order assigned above indicate the 5 bit control state code previously discussed in connection with FIG. 4. Thus, following activation of the initialization circuit 15, the control circuit 12 is in the control state 00110.

It should be noted that the control state 00110 is indicated by the existence of the signal P1 = 1 at the output of the AND gate 122. Similarly, the existence of the control state 00111 is indicated by the signal P4 = 1 at the output of the AND gate 125. Thus, one of the signals P1 through P14 is equal to 1 when the control circuit 12 is in a corresponding one of the respective control states.

Figure 7:
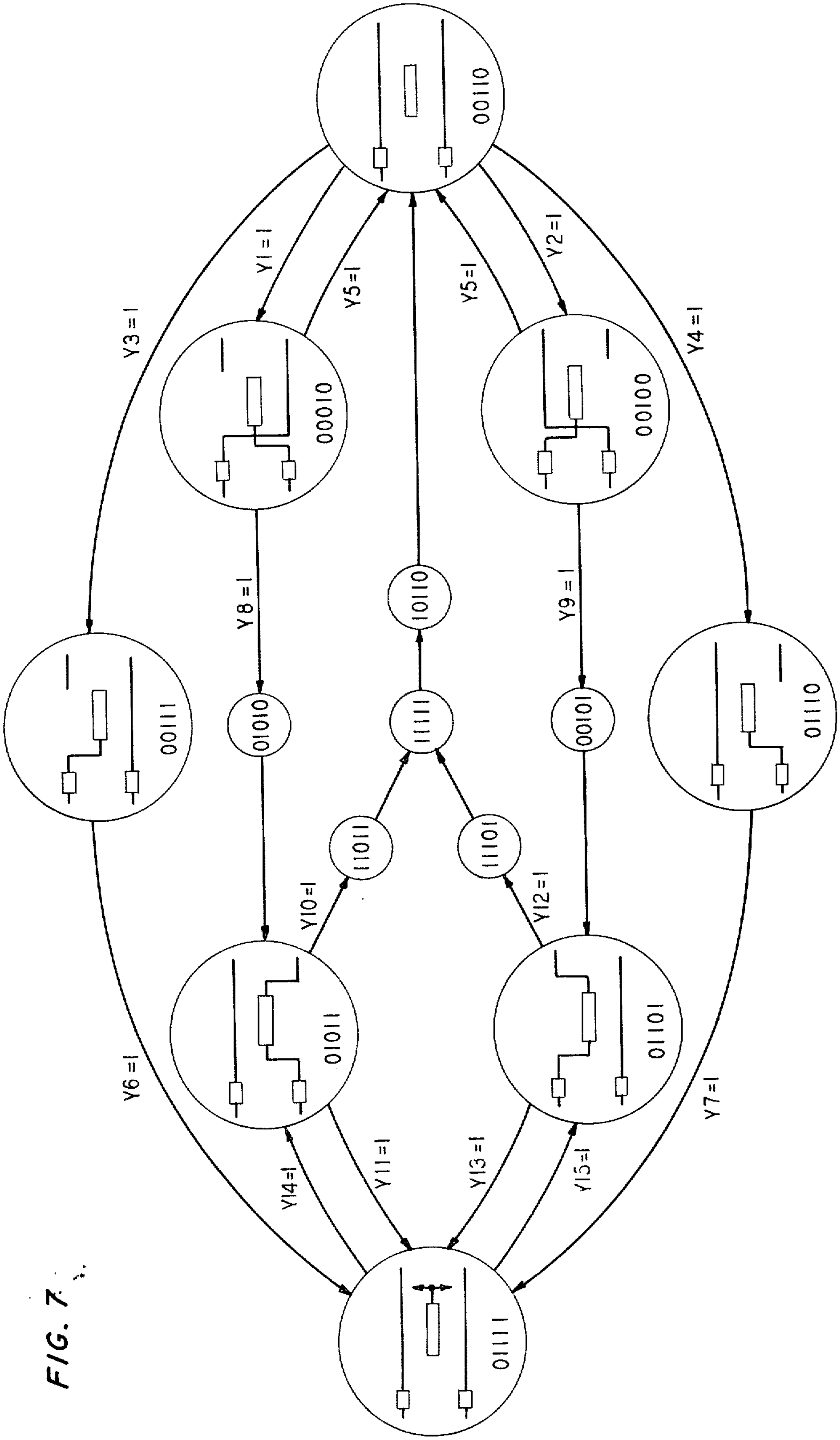
FIG. 7 shows a state transition diagram for the control circuit shown in FIG. 6.

It can be seen in FIG. 6 that the "P" signals, or more specifically the signals P1 through P14, are selectively combined in the AND gates 95 through 110 with signals bearing the designation Y1 through Y15. These "Y" signals are shown in FIGS. 7 and 8 to be the signals which determine the transition from one control state to another. For example, in order to change the control state of the control circuit 12 (FIG. 2) from the control state 00110 to the control state 00111, it is only necessary to set the flip-flop L (FIG. 6). Thus, if the control circuit 12 (FIG. 6) is in the control state 00110 indicated by the signal P1 equal to 1 when the signal Y3 equal to 1 is generated, the 1 signal output of the AND gate 95 is applied through the OR gate 120 to the S input of the flip-flop L. As a result, the flip-flop L becomes set and the control state of the control circuit 12 (FIG. 2) becomes 00111.

This mechanism for changing control state is employed in all transitions of control state for the control circuit 12. Therefore, in the interest of brevity, detailed discussion of the changing of control states will be limited below to a discussion of the generation of the "Y" signals which stimulate the transitions.

As an additional note, it should be observed that the gating signals Z1 through Z8 are generated at the outputs, respectively, of the OR gates 160 (FIG. 6) through 167. The inputs to these OR gates are selected ones of the "P" signals which represent the control states of the control circuit 12. Thus, in the case of the gating signal Z1, the Z1 signal output of the OR gate 160 is equal to 1 when either the signal P7 or the signal P12, both of which are applied to inputs of the OR gate 160, is equal to 1. The signal P7 is equal to 1 when the control state 01101 (FIG. 4) is assumed by the control circuit 12 and the signal P12 (FIG. 6) is equal to 1 when the transitional control state 11101 is assumed by the control circuit 12. It can be seen by referring to FIG. 5 that the gating signal Z1 is, thus, equal to 1 in accordance with the table shown therein and only for the control states 01101 and 11101. In like manner, each of the OR gates 161 through 167 has applied to its inputs the appropriate "P" signals to comply with the requirements shown in FIG. 5 for the respective gating signals.

With the above comments regarding the structure of the control circuit 12 and the generation of the required gating signals, attention is now turned to the general operation of the control circuit 12 and the generation of the "Y" signals which produce the transitions between control states. In this regard, attention is turned to the monostable 77. As can be seen in FIG. 6 the output of the phase locked loop clock 11 is applied to the input of the monostable 77. The signal $\overline{CLK1}$ produced by the monostable 77 is equal to 0 for a period approximately equal to one-eighth of a clock period following the occurrence of a positive transition of the signal CLK1. The signal $\overline{CLK1}$ is thereafter equal to 1 unitl the next positive transition of the signal CLK1. Thus, the signal $\overline{CLK1}$ may be thought of as an inverted clock signal CLK1 with an altered duty cycle.

With the next position transition of the signal $\overline{CLK1}$ following the generation by the synchronization code detector 13 the signal SCD equal to 1, indicating that the synchronization code of a message has been shifted to the final stage of the register R1, the AND gate 78, to which both signals are applied, generates a 1 signal which sets the flip-flop M1. The state of this flip-flop is used to indicate whether or not a message is currently being received by the shift register R1. The setting of the flip-flop M1 produces the signal M1 = 1 indicating a message is currently being received. The signal M1 = 1 is applied to an input of the AND gate 66 and enables the AND gate 66 to pass to its output the $\overline{CLK1}$ signals which are applied to its other input. The output of the AND gate 66, in turn, is applied to the counter 65 which counts the positive going transitions of the signal. Thus, following the setting of the flip-flop M1 the counter 65 begins to count the positive transitions of the signal $\overline{CLK1}$. It should be observed that the outputs of the counter 65 are applied to detector 24. The detector 24 (FIG. 6) generates a 1 signal at its output when the counter 65 reaches a number indicating that the entire message has been received by the shift register R1 and has been shifted to the output of that register. This 1 signal is applied through the OR gate 79 to the R input of the flip-flop M1 thereby resetting the flip-flop. Thus, it should be observed that the signal M1 is equal to 1 as long as a message is being received from the loop 1 and is being shifted through the shift register R1.

The 1 signal generated by the detector 24 is also applied to one input of the AND gate 67. The other input of the AND gate 67 is the signal $\overline{M1}$ which becomes equal to 1 following the resetting of the flip-flop M1. As a result, a 1 signal is generated at the output of the AND gate 67 and is applied through the OR gate 68 to the reset input of the counter 65. Consequently, the counter 65 is reset.

It is important to note that the monostable 77' operates in a fashion similar to that described for the monostable 77. Similarly, the flip-flop M2 in combination with the counter 65' and the detector 24' operates to produce the signal M2 equal to 1 as long as a message is being received from the loop 2 and is being shifted through the shift register R2.

As mentioned earlier, when the synchronization code of a message has been shifted into the shift register R1, the control circuit 12 monitors the contents of the destination loop code field 32 (FIG. 3) of the message to determine its destination loop. More specifically, the outputs of the shift register R1 (FIG. 2) on the lines 16, representing the signals comprising the destination loop code field 32 (FIG. 3) of the message being received, are applied to the loop 2 code detector 27. If the message being received from the loop 1 is destined for the loop 2, the signal $D_{R1,2} = 1$ is generated by the loop 2 code detector 27. In like manner, if a message received from the loop 2 is destined for the loop 1, the loop 1 code detector 27' generates the signal $D_{R2,1} = 1$. These two signals are employed as will be seen subsequently in generating the aforementioned "Y" signals.

From the above it should be clear that the flip-flop M1 in combination with the counter 65, the detector 24, and the loop 2 code detector 27 cooperatively operate to produce the signals M1 and $\overline{\textbf{M1}}$, indicating the message state of the shift register R1, and the signal $D_{R1,2}$ indicating the loop destination for a received message. In like manner, the flip-flop M2, the counter 65', the detector 24', and the loop 1 code detector 27' cooperatively operate to produce the signals M2 and $\overline{\textbf{M2}}$, indicating the message state of the shift register R2, and the signal $D_{R2,1}$ indicating the loop destination of a received message. The application of these signals to the generation of the aforementioned "Y" signals will be described below. Attention is now turned, however, to the flip-flop QA and the signals QA and $\overline{QA}$, which are used to indicate the message state of the shift register Q.

It should first be noted that the state of the flip-flop QA (FIG. 6) indicates whether the shift register Q (FIG. 2) may contain data for transmission on one of the two loops. More specifically, when the flip-flop QA (FIG. 6) is in the set state and the signal QA is equal to 1, the shift register Q (FIG. 2) may contain a message which is to be transmitted on one of the loops. It is important to note that there is only a possibility that the shift register Q contains such a message. When, conversely, the signal QA = 0 is generated, the shift register Q (FIG. 2) does not contain a message for transmission on either of the two loops.

The flip-flop QA (FIG. 6) assumes the set state and generates the signal QA = 1 when the flip-flop FF1 becomes set, since the output of the flip-flop FF1 is applied to the S input of the flip-flop QA. It should be noted that the setting of the flip-flop FF1 is controlled by the output signal from the OR gate 54 to which the outputs of the AND gates 52 and 53 are respectively applied. Thus, if either of the AND gates 52 and 53 generates a 1 signal, flip-flop FF1 is set and, thereafter, the flip-flop QA is set. It is, therefore, of interest to note that one of the inputs of the AND gate 52 is connected to the output of the OR gate 41'. The inputs to the OR gate 41' are the signals P3, P4, P7, and P10 which are respectively equal to 1 when the control circuit 12 assumes the respective control states 00100 (FIG. 4), 00111, 01101, and 00101. It should be noted from FIG. 4 that a common property of all of these control states is that when the control circuit 12 has assumed each of these control states, the register Q is connected to the output of the register R1. As a result, when the control circuit 12 has assumed any of these control states, the register Q may be loaded with the message from the loop 1. Thus, in the event any of these four control states is assumed by the control circuit 12, a 1 signal is generated at the output of the OR gate 41', and applied to the input of the AND gate 52. The other input of the AND gate 52 is driven by the signal M1. Consequently, if a message is being received by the shift register R1 (FIG. 2) as indicated by the signal M1 = 1 when one of the four aforementioned control states is assumed by the control circuit 12 (FIG. 6), flip-flop FF1 becomes set.

In like manner, the output of the AND gate 53, previously mentioned, becomes equal to 1 if a control state is assumed by the control circuit 12 in which the shift register Q is connected to the output of the shift register R2. More specifically, the input of the AND gate 53 is connected to the output of the OR gate 40'. The inputs of this OR gate are the signals P2, P5, P6, and P9 which are respectively equal to 1 when the control circuit 12 assumes the control states 00010 (FIG. 4), 01110, 01011, and 01010. The other input of the AND gate 53 (FIG. 6) is the signal M2 which becomes equal to 1 when a message is being received by the shift register R2 (FIG. 2). Thus, if one of the aforementioned four control states is assumed by the control circuit 12 simultaneously with the signal M2 (FIG. 6) being equal to 1, flip-flop FF1 becomes set, setting the flip-flop QA.

It should be noted from the earlier description of the operation of the interloop communication terminal when the control circuit 12 is in one of the control states of the aforementioned two groups of control states, that message signals are shifted into the register Q selectively from register R1 or R2. Since the shifting of these two registers is controlled by different clock signals, it is necessary to select the appropriate clock signal for controlling the shifting of the signals into the shift register Q. This selection of clock signals is provided by the AND gates 150 and 151 in combination with the OR gate 152. More specifically, an input of the AND gate 150 is driven by the output of the OR gate 41', previously described. Thus, whenever the control circuit 12 assumes a control state in which any of the four signals P3, P4, P7, and P10 is equal to 1, the OR gate 41' generates a 1 signal and enables the AND gate 150 to pass the clock signal CLK1 to an input of the OR gate 152. In like manner, whenever the control circuit 12 assumes a control state such that one of the signals P2, P5, P6, and P9 is equal to 1, the OR gate 40' produces a 1 signal which is applied to an input of the AND gate 151, enabling the AND gate 151 to pass the clock signals CLK2 to an input of the OR gate 152. In this fashion, according to the control state of the control circuit 12, the clock signals are applied through the OR gate 152 to the shift input of the register Q.

With the above discussion in mind it should now be observed that the output of the flip-flop FF1 (FIG. 6) is not only applied to the S input of the flip-flop QA but is also applied to an input of the AND gate 51. The other input of the AND gate 51 is driven by the output of the OR gate 58 which, in turn, is responsive to the outputs of the AND gates 59 and 60. It can be seen that the AND gates 59 and 60 together perform a selection operation, selecting between the clock signals $\overline{CLK1}$ and $\overline{CLK2}$ in a manner similar to that just described for the selection of the clock signals CLK1 and CLK2. Inputs of the AND gates 59 and 60 are driven respectively by output signals from the OR gates 40 and 41 which perform the same functions as described above for the OR gates 40' and 41', respectively. Thus, in this manner the appropriate clock signals are applied through the OR gate 58, the AND gate 51, and the OR gate 50 to the counter 23, ensuring the accurate counting of the clock signals which are directly related to the signals shifting message signals into the shift register Q.

Having set the flip-flop FF1 and enabled the selected clock signals to counter 23, each positive going transition of the selected clock signals increases the count of the counter 23. The outputs of this counter are applied to the detector 21. This detector generates a 1 signal at its output when it determines that the counter 23 has counted a number of clock pulses equal to the number of stages in the shift register Q. When this 1 signal is generated by the detector 21, the flip-flop FF1 is reset through the OR gate 55. Thus, any message which has been received by the interloop communication terminal has been stored in the shift register Q when the detector 21 generates its output signal and resets the flip-flop FF1.

It should be noted that the output of the detector 21 is also applied to inputs of the AND gates 56 and 57. The other inputs of those AND gates are respectively signals appearing on the lines 73 and 74 from the loop code detector 72. It is the function of the loop code detector 72, which is connected to the shift register Q, to monitor the destination loop code field 32 (FIG. 3) of a message stored in the shift register Q (FIG. 6) and generate a signal on line 73 if the destination loop code field 32 (FIG. 3) of the stored message indicates the message is intended for loop 2 (FIG. 6). In addition, the loop code detector 72 generates a signal on line 74 if the destination loop code field 32 (FIG. 3) indicates the stored message is intended for loop 1 (FIG. 6). The signals on the lines 73 and 74 are respectively combined in the AND gates 56 and 57 with the output signal from the detector 21 to form the signals DA2 and DA1. The function of these two signals is to indicate to which of the two loops the output of the shift register Q must be connected for transmission of the message stored therein. These signals are combined with other control signals to produce the aforementioned "Y" signals described in more detail below.

It should be noted that immediately following the resetting of the flip-flop FF1, the AND gate 51 is no longer enabled to pass clock signals appearing at its other input to the counter 23 through the OR gate 50. Thus, the count in the counter 23 remains fixed. It is possible, however, for the count in the counter 23 to advance beyond its current value if the flip-flop FFO becomes set. More specifically, the Q output of the flip-flop FFO is applied to an input of the AND gate 49. The other input of the AND gate 49 is the previously described output of the OR gate 58 consisting of the selected clock signal. The output of the AND gate 49 is applied through the OR gate 50 to the counter 23. Thus, when the flip-flop FFO becomes set, counter 23 continues the count of the positive transitions of the selected clock signals.

In order to set the flip-flop FFO a 1 signal must be applied to the S input of the flip-flop FFO by the monopulser 44. The monopulser 44 is driven by the OR gate 42 to which the signals P6 and P7 are applied. Thus, when the control circuit 12 enters either of the control states 01011 and 01101, the OR gate 42 produces a 1 signal which ultimately results in the setting of the flip-flop FFO.

To illustrate the operation of the above described elements and selected related elements in the control circuit 12, assume that a message is being loaded into the shift register Q, as indicated by the existence of the signal QA = 1, while the control circuit 12 is in the state 00010 (FIG. 4) and that the counter 23 (FIG. 6) contains a count less than the number of stages in the shift register Q. Further, assuming that loop 2 is busy, as indicated by the existence of the signal M2 = 1, and loop 1 is idle, as indicated by the existence of the signal $\overline{M1}$ = 1, also assume that the AND gate 82 generates the signal Y8 = 1 which, when combined with the signal P2 = 1 in the AND gate 108, initiates the transition through the transitional control state 01010 (FIG. 4) to the control state 01011 in which the signal P6 (FIG. 6) is equal to 1. When the control state 01011 is entered, the monopulser 44 generates a pulse which sets the flip-flop FFO which, in turn, enables the AND gate 49 to pass clock signals $\overline{CLK2}$ appearing at the output of the OR gate 58 through the OR gate 50 to the counter 23. As a result, the counter 23 advances its count with each positive transition of the selected clock signal even after the detector 21 generates a 1 signal which resets the flip-flop FF1. When the counter 23 reaches a count equal to twice that of the number of stages in the shift register Q, the detector 22, which is connected to the counter 23, generates at its output a 1 signal indicating that the entire message previously stored in the shift register Q has been shifted out of that register. The 1 signal generated by the detector 22 is applied to one of the inputs of the OR gate 45 and to one of the inputs of the AND gate 46. The application of the 1 signal from the detector 22 to one of the inputs of the OR gate 45 produces a 1 signal which is applied to the R input of the flip-flop FF0. Consequently, the flip-flop FF0 is reset. In further consequence, a 1 signal appears at the $\overline{Q}$ output of the flip-flop FF0 which is applied to the other input of the AND gate 46. As a result, the AND gate 46 produces a 1 signal which is applied to the R input of the flip-flop QA, resetting it. It should also be noted that the 1 signal generated by the detector 22 is also applied through the OR gate 48 to the reset input of the counter 23. Thus, the counter 23 is also reset.

It is important to note, however, that if, after the flip-flop FF0 is set by the pulse from the monopulser 44, a message is received from loop 2, as indicated by the generation of the signal M2 = 1, the monopulser 63' generates a 1 signal pulse which is applied to an input of the AND gate 61. The other input of the AND gate 61 is the previously discussed output of the OR gate 40. Since the output of the OR gate 40 is equal to 1 as a result of the signal P6 being equal to 1, the output of the AND gate 61 responds to the pulse from the monopulser 63'. This pulse is applied through the OR gate 47, and the OR gate 48 to the reset input of the counter 23. Thus, it can be seen that if a message is received from a loop while the message previously stored in the shift register Q is being transmitted on that loop, the counter 23 is reset. As long as the message which is received is intended for loop 2, no transition in control state is effected by the control circuit 12 and the counter 23 counts the applied clock signals until the detector 22 generates the aforementioned 1 signal at its output, indicating that the entire message has been shifted out of the shift register Q. It should be noted, however, that if the message received is intended for loop 1, the 1 signal generated at the output of the detector 21 when the full message has been shifted into the shift register Q enables the AND gate 57 to produce the signal DA1 = 1. This signal is combined with the signals $\overline{M2}$ = 1 and QA = 1 in the AND gate 85 to produce the signal Y11 which effects a transition in control state to the control state 01111 (FIG. 7).

The above has discussed the generation of the primary signals used to control the operation of the control circuit 12. As has been previously described, several of these signals are logically combined to produce the aforementioned "Y" signals which are logically combined with the "P" signals representing the control states of the control circuit 12 to effect the transitions in control state discussed in detail in connection with FIG. 4. The following table shows the boolean expressions for logically combining the signals described above to generate the "Y" signals employed in the control circuit 12:

$$
\begin{aligned}
Y1 &= \overline{QA} \cdot \overline{M2} \cdot D_{R1,2} \\
Y2 &= \overline{QA} \cdot \overline{M1} \cdot D_{R2,1} \\
Y3 &= \overline{QA} \cdot M2 \cdot D_{R1,2} \\
Y4 &= \overline{QA} \cdot M_1 \cdot D_{R2,1} \\
Y5 &= \overline{QA} \cdot \overline{M1} \cdot \overline{M2} \\
Y6 &= QA \cdot \overline{M1} \\
Y7 &= QA \cdot \overline{M2} \\
Y8 &= QA \cdot \overline{M1} \cdot M2 \\
Y9 &= QA \cdot M1 \cdot \overline{M2} \\
Y10 &= \overline{QA} \cdot \overline{M2} \\
Y11 &= QA \cdot DA1 \cdot \overline{M2} \\
Y12 &= \overline{QA} \cdot \overline{M1} \\
Y13 &= QA \cdot DA2 \cdot \overline{M1} \\
Y14 &= QA \cdot DA2 \cdot \overline{M2} \\
Y15 &= QA \cdot DA1 \cdot \overline{M1}
\end{aligned}
$$

The "Y" signals are generated by the AND gates 80 through 94. A control state transition chart is shown in FIG. 8 indicating the control state transitions resulting from the existence of each of the above described "Y" signals. This chart is represented in a pictorial form in FIG. 7 similar to that of FIG. 4.

In the above discussion reference has been made to the cable drivers 14 and 14' (FIG. 6) of which cable driver 14 is typical. The cable drivers are not important to this invention and any of many known in the prior art will suffice. The typical cable driver 14 employs an AND gate 171, a delay circuit 172, and an impedance matcher 170. The signals appearing at the output of the OR gate B2 are applied to one input of the AND gate 171. The other input of the AND gate 171 is driven by the output of the delay circuit 172. The delay circuit 172 delays the clock signal appearing at the output of the OR gate 142 by an amount approximately one-fourth of the average expected clock period to compensate for possible delays in the control circuit 12. The clock signal appearing at the output of the OR gate 142 is selected from the two clock signals CLK1 and CLK2. More specifically, the inputs to the OR gate 142 are driven by outputs of the AND gates 140 and 141, respectively. The AND gate 140 has as its inputs the clock signal CLK1 and the signal $\overline{P3}$. Thus, if the control circuit 12 is in any control state other than the control state 00100 (FIG. 7) in which the signal $\overline{P3}$ is equal to 0, the AND gate 140 is enabled to pass the clock signal CLK1 through the OR gate 142 to the delay circuit 172. If, however, the control circuit 12 is in the control state 00100, the AND gate 141 is enabled by the signal P3 = 1 to pass the clock signal CLK2 through the OR gate 142 to the delay circuit 172. This arrangement ensures that the clock signal most appropriate to the message being transmitted is employed in the transmission of that message on the transmission loop. A similar arrangement is employed for obtaining the correct clock signal for the cable driver 14' with the exception that the gating selection is based on the signals P2 and $\overline{P2}$.

The above discussion has described applicant's invention in terms of one specific illustrative embodiment. Upon reading this disclosure additional embodiments of this invention equally within its spirit and scope will become apparent to those skilled in the art.

What is claimed is:

1. In a data transmission arrangement comprising a plurality of data transmission loops, an interloop communication terminal comprising:

first means for monitoring messages received on a first of said loops to determine the busy/idle status of said first loop;

second means for detecting a message destined for said first loop and received on a second of said loops; and means coupled to said first means and to said second means for transmitting on said first loop, if said first loop is idle, a message destined for said first loop and received on said second loop or for storing said message if said first loop is busy.

2. In a data transmission arrangement for transmitting messages between transmission terminals, each serially connected in one of a plurality of data transmission loops, an interloop communication terminal serially connected in two of said data transmission loops, comprising:

first means for monitoring messages received on a first of said two data transmission loops to separate messages directed to transmission terminals serially connected in the second of said two data transmission loops; and second means comprising means for initiating the transmission on said second transmission loop of a monitored message directed to a transmission terminal connected in said second transmission loop if a message is not currently being received by said interloop communication terminal on said second transmission loop or for storing said monitored message if a message is currently being received by said interloop communication terminal on said second transmission loop.

3. The interloop communication terminal of claim 2 wherein said second means further comprises means for transmitting on said first transmission loop a monitored message directed to a transmission terminal on said second transmission loop is a priorly monitored message directed to a transmission terminal on said second transmission loop was stored and has not been transmitted on said second transmission loop.

4. An interloop communication terminal comprising: means for receiving messages on a first transmission loop; means for monitoring messages received on said first transmission loop to detect messages directed to a second transmission loop; means for determining the busy/idle status of said second transmission loop; characterized in that:

said interloop communication terminal further comprises means for transmitting on said second transmission loop if said second transmission loop is idle a message received on said first transmission loop and directed to said second transmission loop or for storing such message if said second transmission loop is busy.

5. In a data transmission arrangement comprising a plurality of data transmission loops, an interloop communication terminal serially connected in two of said data transmission loops comprising:

a first serial storage means coupled to a first of said two data transmission loops;

a second serial storage means;

transmitter means for transmitting signals on the second of said two data transmission loops; and means including means for selectively coupling said transmitter means to said first serial storage means or to said second serial storage means and further including means for coupling said second serial storage means to said first serial storage means.

6. In a data transmission arrangement comprising a plurality of data transmission loops, an interloop communication terminal comprising:

a first serial storage means coupled to a first of said data transmission loops for receiving messages from said loop;

a second serial storage means;

first monitoring means connected to said first serial storage means for monitoring received messages to detect messages directed to a second of said data transmission loops;

second monitoring means for monitoring the reception of messages on said second transmission loop to determine the busy/idle status of said second transmission loop; and means coupled to said first and second monitoring means for coupling said second serial storage means to said first serial storage means when a message directed to said second transmission loop is received by said first serial storage means and said second transmission loop is busy.

7. In a data transmission arrangement comprising a plurality of data transmission loops, an interloop communication terminal, having first and second input ports and first and second output ports, comprising:

first serial storage means comprising: a serial output terminal; and a serial input terminal coupled to said first input port;

second serial storage means comprising: a serial input terminal and a serial output terminal;

first gating means connected to said serial output terminal of said first serial storage means for gating signals to said serial input terminal of said second serial storage means;

first logical summing means comprising: a first input terminal; a second input terminal; and an output terminal coupled to said first output port;

second logical summing means comprising: a first input terminal; a second input terminal; and an output terminal coupled to said second output port;

second gating means connected to said serial output terminal of said second storage means for gating signals to said first input terminal of said first logical summing means;

third gating means connected to said serial output terminal of said second serial storage means for gating signals to said first input terminal of said second logical summing means; and fourth gating means connected to said serial output terminal of said first serial storage means for gating signals to said second input terminal of said second logical summing means.

8. The interloop communication terminal of claim 7 further comprising a fifth gating means connected to said serial output terminal of said first serial storage means for gating signals to said second input terminal of said first logical summing means.

9. In a data transmission arrangement comprising first and second data transmission loops, an interloop communication terminal, comprising:

a first input port coupled to said first data transmission loop;

a first output port;

said first data transmission loop being coupled to said first output port;

a second output port;

said second data transmission loop being coupled to said second output port;

a first shift register comprising: a serial input terminal; and a serial output terminal;

means for coupling said input terminal of said first shift register to said first input port;

a second shift register comprising: a serial input terminal;

first logical summing means comprising: a first input terminal; and an output terminal coupled to said first output port;

second logical summing means comprising a first input terminal; and an output terminal coupled to said second output port;

first gating means coupled to said serial output terminal of said first shift register for gating signals to said input terminal of said second shift register;

second gating means coupled to said serial output terminal of said first shift register for gating signals to said first input terminal of said first logical summing means; and third gating means coupled to said serial output terminal of said first shift register for gating signals to said first input terminal of said second logical summing means.

10. The interloop communication terminal of claim 9 wherein: said first logical summing means further comprises a second input terminal; said second logical summing means further comprises a second input terminal; and said second shift register further comprises a serial output terminal; further comprising:

fourth gating means coupled to said serial output terminal of said second shift register for gating signals to said second input terminal of said first logical summing means; and fifth gating means coupled to said serial output terminal of said second shift register for gating signals to said second input terminal of said second logical summing means.

11. The interloop communication terminal of claim 10 further comprising:

a third shift register comprising: a serial input terminal; and a serial output terminal;

a second input port coupled to said second data transmission loop;

means for coupling said serial input terminal of said third shift register to said second input port;

said first logical summing means further comprising a third input terminal;

said second logical summing means further comprising a third input terminal;

sixth gating means coupled to said serial output terminal of said third shift register for gating signals to said third input terminal of said first logical summing means;

seventh gating means coupled to said serial output terminal of said third shift register for gating signals to said third input terminal of said second logical summing means;

said first gating means comprising: a third logical summing means having an output terminal connected to said serial input terminal of said second shift register, a first input terminal, and a second input terminal; and means connected to said serial output terminal of said first shift register for gating signals to said first input terminal of said third logical summing means; and eighth gating means coupled to said serial output terminal of said third shift register for gating signals to said second input terminal of said third logical summing means.

* * * * *